(12) United States Patent
Latham et al.

(10) Patent No.: US 6,789,578 B2
(45) Date of Patent: Sep. 14, 2004

(54) REMOTELY OPERABLE CLOSURE DEVICE

(75) Inventors: Raymond E. Latham, Houston, TX (US); Gyula Pasztor, Houston, TX (US)

(73) Assignee: Reflange, Inc., Houston, TX (US)

( * ) Notice: Subject to any disclaimer, the term of this patent is extended or adjusted under 35 U.S.C. 154(b) by 199 days.

(21) Appl. No.: 10/135,199

(22) Filed: Apr. 30, 2002

(65) Prior Publication Data

US 2002/0179167 A1 Dec. 5, 2002

Related U.S. Application Data

(60) Provisional application No. 60/288,147, filed on Apr. 30, 2001.

(51) Int. Cl.[7] ............................................. F16L 55/10
(52) U.S. Cl. ...................... 138/89; 138/96 R; 285/15; 220/324; 220/263
(58) Field of Search .............................. 138/96 R, 96 T, 138/89, 90; 285/18, 901, 315, 320; 215/275, 280; 220/262, 263, 319, 320, 324, 323

(56) References Cited

U.S. PATENT DOCUMENTS

| | | | | |
|---|---|---|---|---|
| 2,707,575 A | * | 5/1955 | Wheatley | 220/323 |
| 3,672,403 A | * | 6/1972 | Wilson et al. | 138/89 |
| 3,997,197 A | | 12/1976 | Marsh et al. | 285/93 |
| 4,014,367 A | * | 3/1977 | Milo | 138/89 |
| 4,133,558 A | | 1/1979 | Ahlstone | 285/39 |
| 4,153,278 A | | 5/1979 | Ahlstone | 285/18 |
| 4,351,446 A | * | 9/1982 | Madden | 220/210 |
| 4,477,105 A | | 10/1984 | Wittman et al. | 285/18 |
| 4,688,632 A | * | 8/1987 | Cooley, Jr. | 166/85.5 |
| 4,707,323 A | * | 11/1987 | Vowell | 376/203 |
| 4,730,853 A | * | 3/1988 | Gjessing | 285/18 |
| 5,368,342 A | | 11/1994 | Latham et al. | 285/261 |
| 5,412,981 A | * | 5/1995 | Myers et al. | 73/119 A |
| 5,640,999 A | * | 6/1997 | Wood | 138/89 |
| 6,003,558 A | * | 12/1999 | Neto et al. | 138/89 |
| 6,070,912 A | | 6/2000 | Latham | 285/61 |
| 6,305,720 B1 | * | 10/2001 | Spiering et al. | 285/18 |
| 6,363,973 B1 | * | 4/2002 | Fiebig | 138/89 |
| 6,568,554 B2 | * | 5/2003 | Booth et al. | 220/316 |

OTHER PUBLICATIONS

"GrayLoc: Remotely Operated Connections, Quick Disconnect Connections," Bulletin 66–2, Gray Tool Company, undated, p. 1–5.

"General Product Specification: Collet Connector," No. 11–891219 by HydroTech Systems, 1975, p. 1–3 and Figures 1–2.

"BIMS Proposal to Supply Subsea Connection Systems for the Kerr–McGee Oil and Gas Corporation," Product Description Section 3, Big Inch, Mar. 2000, p. 2–25.

* cited by examiner

Primary Examiner—Patrick Brinson
(74) Attorney, Agent, or Firm—Howrey LLP

(57) ABSTRACT

A remotely operable closure device is disclosed. The device includes a base hub, a clamping mechanism, a closure mechanism, and a drive mechanism. The base hub is attached to a conduit and allows access to the conduit. The clamping mechanism is disposed about the base hub and is actuatable to clamp or unclamp about the base hub and a blind hub. The closure mechanism is movably connected to the clamping mechanism and is actuatable therewith to move the blind hub into or out of engagement with the base hub. The drive mechanism is remotely operable to simultaneously actuate the clamping mechanism and the closure mechanism.

20 Claims, 5 Drawing Sheets

REMOTELY OPERABLE CLOSURE DEVICE

CROSS-REFERENCE TO RELATED APPLICATIONS

This application claims priority to the Provisional Application No. 60/288,147 filed Apr. 30, 2001.

BACKGROUND OF THE INVENTION

1. Field of the Invention

This invention relates generally to pipeline closures, and particularly to clamp-type closures that are designed for pigging subsea petroleum pipelines.

2. Description of the Prior Art

Petroleum products flowing through pipelines deposit silt, mud, and foreign material on the walls of the pipe, much like fatty deposits within arteries. Debris traveling through oil pipelines has a tendency to accumulate on the pipe wall, which accordingly reduces the flow area and efficiency of the pipeline. Further, water and other liquids settle in low points of gas pipelines, forming similar obstructions to the flow of fluid through the line. To clean, or flush-out, the pipeline it is common practice within the petroleum industry to insert a "pig" into the pipeline. For example, U.S. Pat. Nos. 3,125,116; 3,218,660; 3,246,355; and 3,473,550, disclose various devices for launching and receiving pigs in pipelines. The pig may be moved through the pipeline to push any foreign debris that may be obstructing the flow through the line. This foreign material is either removed at the end of the pipeline, or ejected somewhere along the path of the pipeline.

To obtain access to pipeline, a closure device may be used at an opening of the pipeline. Referring to FIGS. 1A–1B, a standard closure device 10 according to the prior art is illustrated. The standard closure device 10 includes a door 12, a clamp 20, and a mounting hub 30. In FIG. 1A, a frontal view shows the door 12 pivoted adjacent the open clamp 20. In FIG. 1B, a side view shows the closure device 10 in a locked down or closed position by solid line and in an open position by dotted line. The door 12 includes a blind hub 14 with a flange 16. The door 12 attaches to the clamp 20 by a hinge 18. The clamp 20 includes first and second clamp segments 22a and 22b, which are locked or retracted with a plurality of threaded rods 24 and nuts 26. The clamp segments 22a and 22b are supported on slide rods 28a and 28b. The mounting hub 30 includes a flange 32 and an opening 34. The opening 34 provides access to a pipeline (not shown). In the closed position shown in FIG. 1A, the flange 16 of the blind 14 and the flange 32 of the mounting hub 30 are held together within grooves 23 in the locked clamp segments 22a and 22b.

To open the standard closure 10, the nuts 28 are loosened to retract the clamp segments 22a and 22b from one another. The hinged door 12 is pivoted to move the blind hub 14 away from the mounting hub 30 and to provide fast, easy access to the opening 32. A safety interlock system (not shown) may prevent opening when the closure 10 is pressurized. Only one operator is required for a quick open/close. The standard closure device 10 utilizes a high-pressure metal-to-metal seal to provide a positive, leak proof seal in applications such as pig launchers and receivers, filters, strainers, reactors, or pressure vessels.

In many adverse environments and/or locations, such as flow lines at subsea oil or gas wellheads, pigging a line may expose divers to extreme danger, that is of course if the depth even allows a diver to be present. The expense and the inherent dangers to life that are associated with diver-assisted pipeline operations prevent many subsea pipelines from being flushed and cleaned. The current invention is directed to a remotely operated closure device.

SUMMARY OF THE INVENTION

One aspect of the present invention provides a closure device. The closure device includes a first mechanism moving a first hub into relation with a second hub attached to a conduit to close access to the conduit or moving the first hub out of relation with the second hub to open access to the conduit. The closure device includes a second mechanism retaining the first hub in sealed engagement with the second hub or releasing the first hub from sealed engagement with the second hub. The closure device includes a third mechanism simultaneously actuating the first mechanism and the second mechanism.

Another aspect of the present invention provides a remotely operable closure, including a base hub, a clamping mechanism, a drive mechanism, and a closure mechanism. The base hub allows access to a conduit. The clamping mechanism is disposed about the base hub and is actuatable to clamp or unclamp about the base hub and a blind hub. The drive mechanism is remotely operable to actuate the clamping mechanism. the closure mechanism is actuatable with the clamping mechanism to move the blind hub into or out of engagement with the base hub.

Yet another aspect of the present invention provides a method for remotely operating a closure. The method includes the steps of: actuating a single mechanism with a first operation; moving a first hub into relation with a second hub to close access to the closure with the first operation; clamping the first hub in sealed engagement with the second hub with the first operation; actuating the single mechanism with a second operation; unclamping the first hub from sealed engagement with the second hub with the second operation; and moving the first hub out of relation with the second hub to open access to the closure with the second operation.

The foregoing summary is not intended to summarize each potential embodiment of every aspect of the invention disclosed herein, but merely to summarize the appended claims.

BRIEF DESCRIPTION OF THE DRAWINGS

The foregoing summary, preferred embodiments, and other features or aspects of the invention will become apparent upon reading the following detailed description and upon reference to the drawings, in which.

Figure 1A:
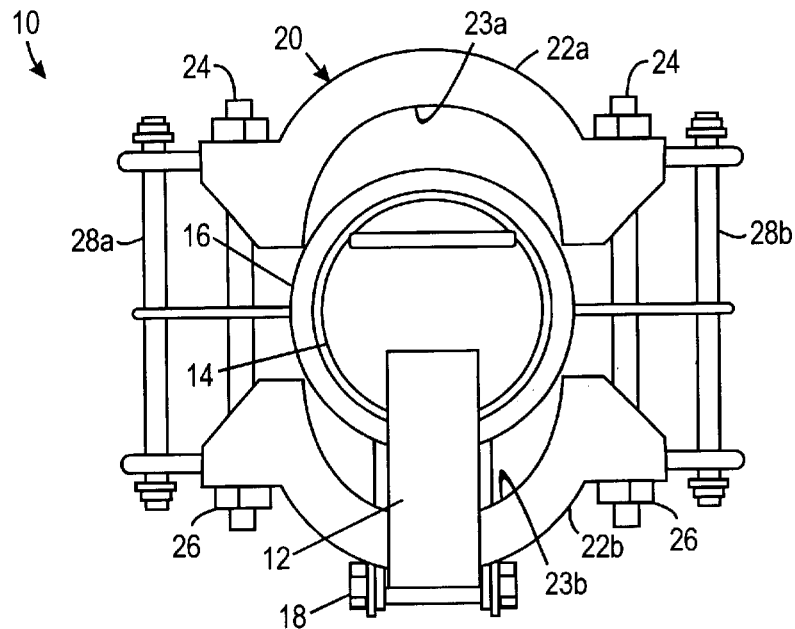
FIGS. 1A–B illustrate perspective views of a standard closure device according to the prior art.
Figure 1B:
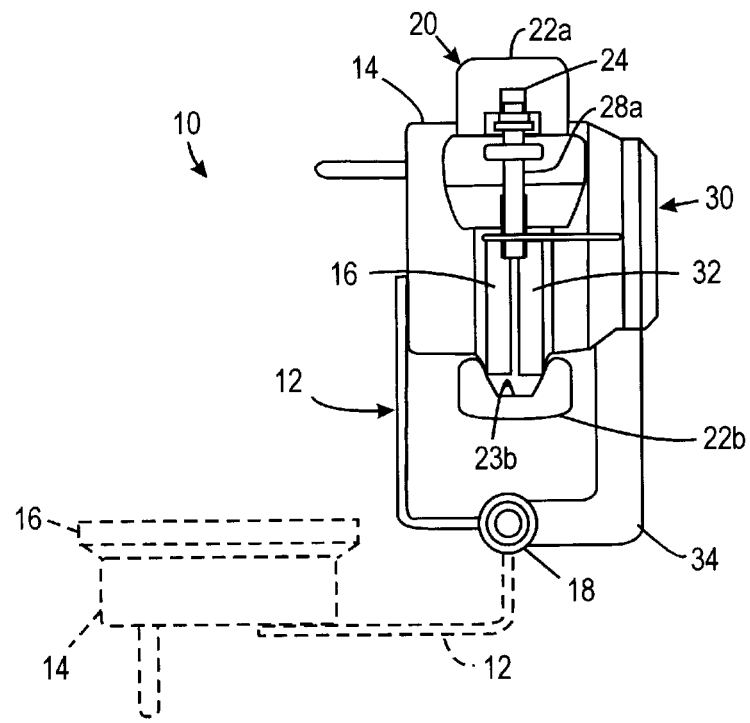

While the invention is susceptible to various modifications and alternative forms, specific embodiments thereof have been shown by way of example in the drawings and are herein described in detail. The Figures and written description are not intended to limit the breadth or scope of the invention in any manner, rather they are provided to illustrate the invention to a person of ordinary skill in the art by reference to particular embodiments of the invention, as required by 35 USC §112.

DETAILED DESCRIPTION OF EMBODIMENTS OF THE INVENTION

Figure 2A:
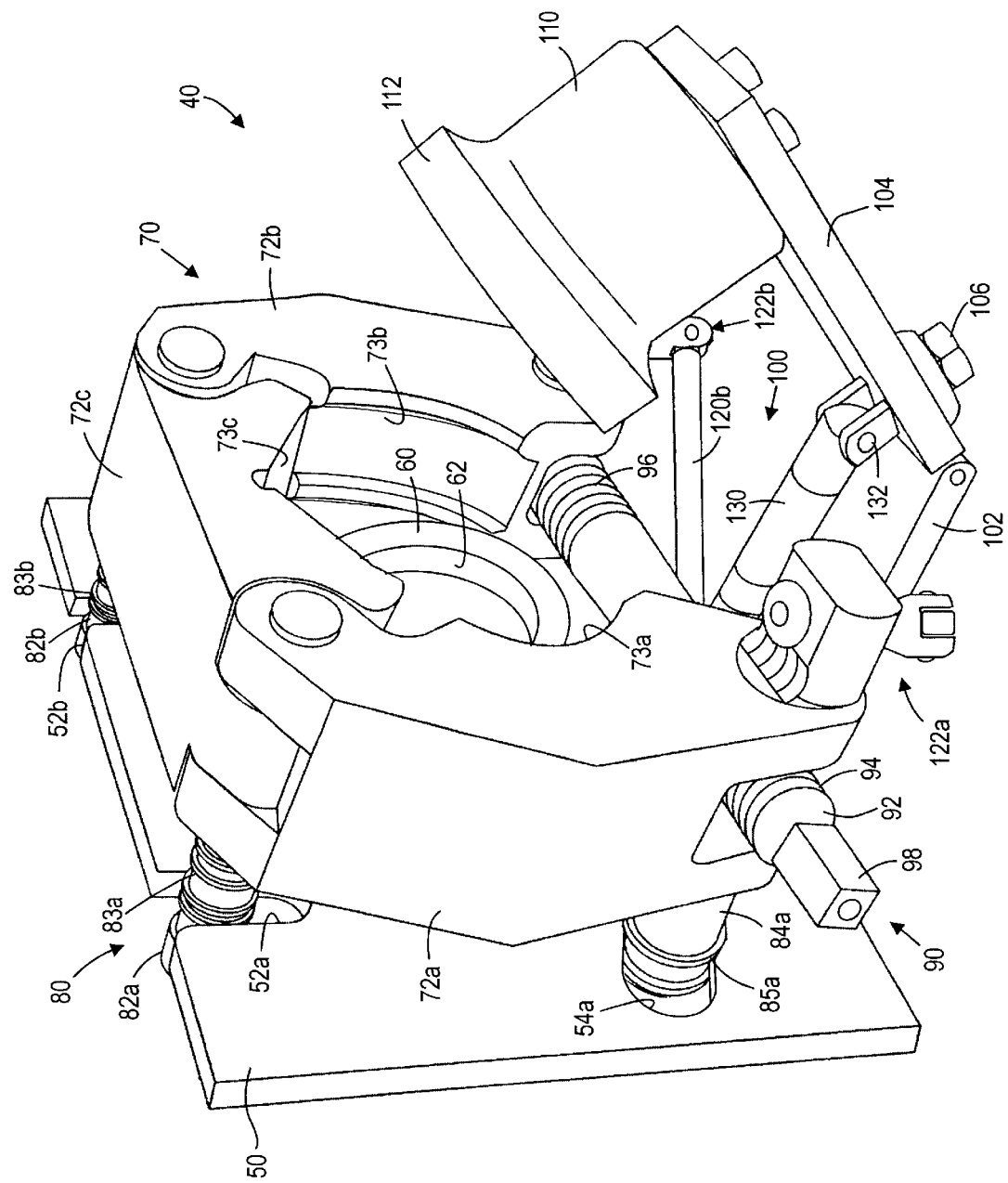
FIGS. 2A–B illustrate perspective views of an embodiment of a remotely operable closure in accordance with the present invention in an open state.
Figure 2B:
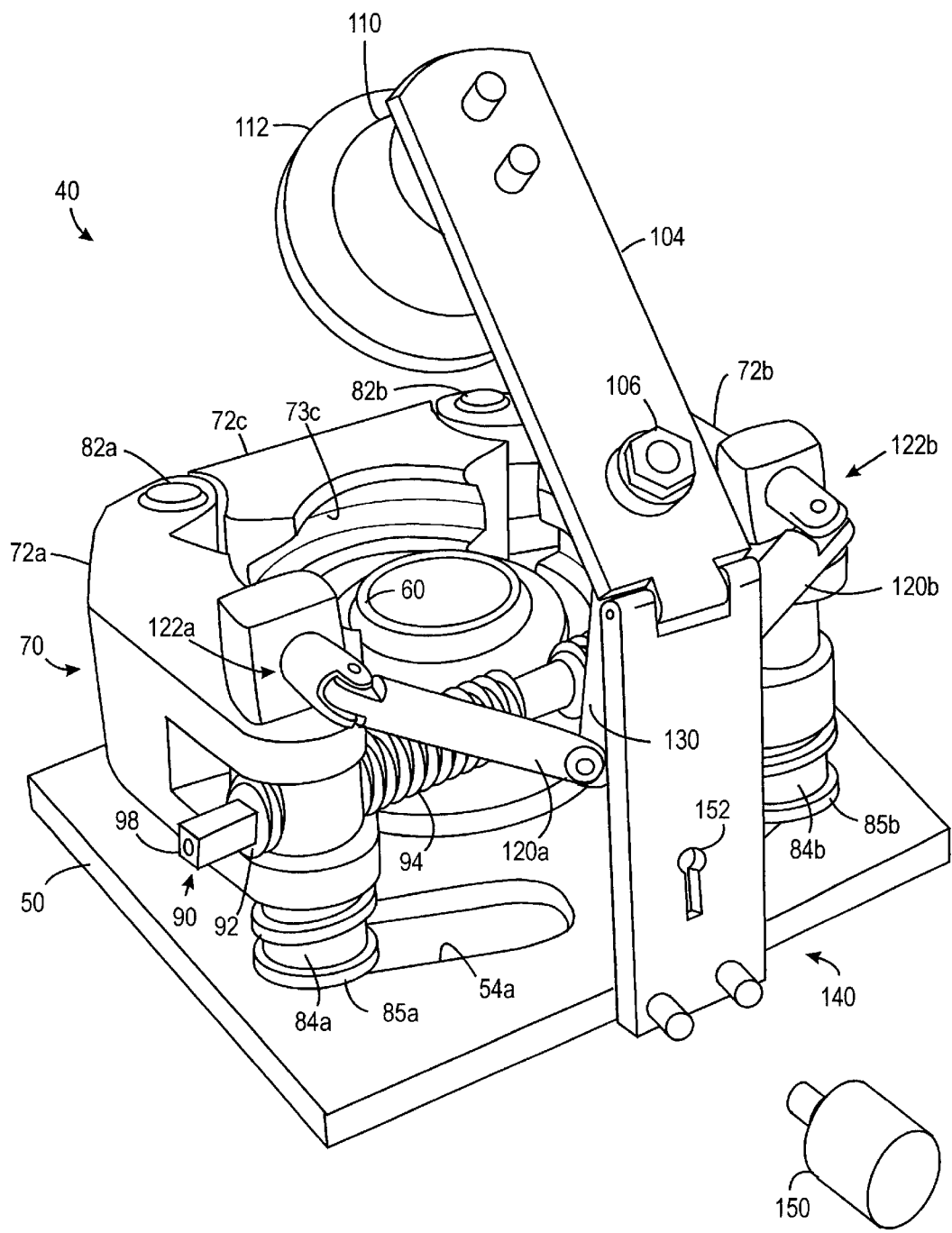
Figure 3A:
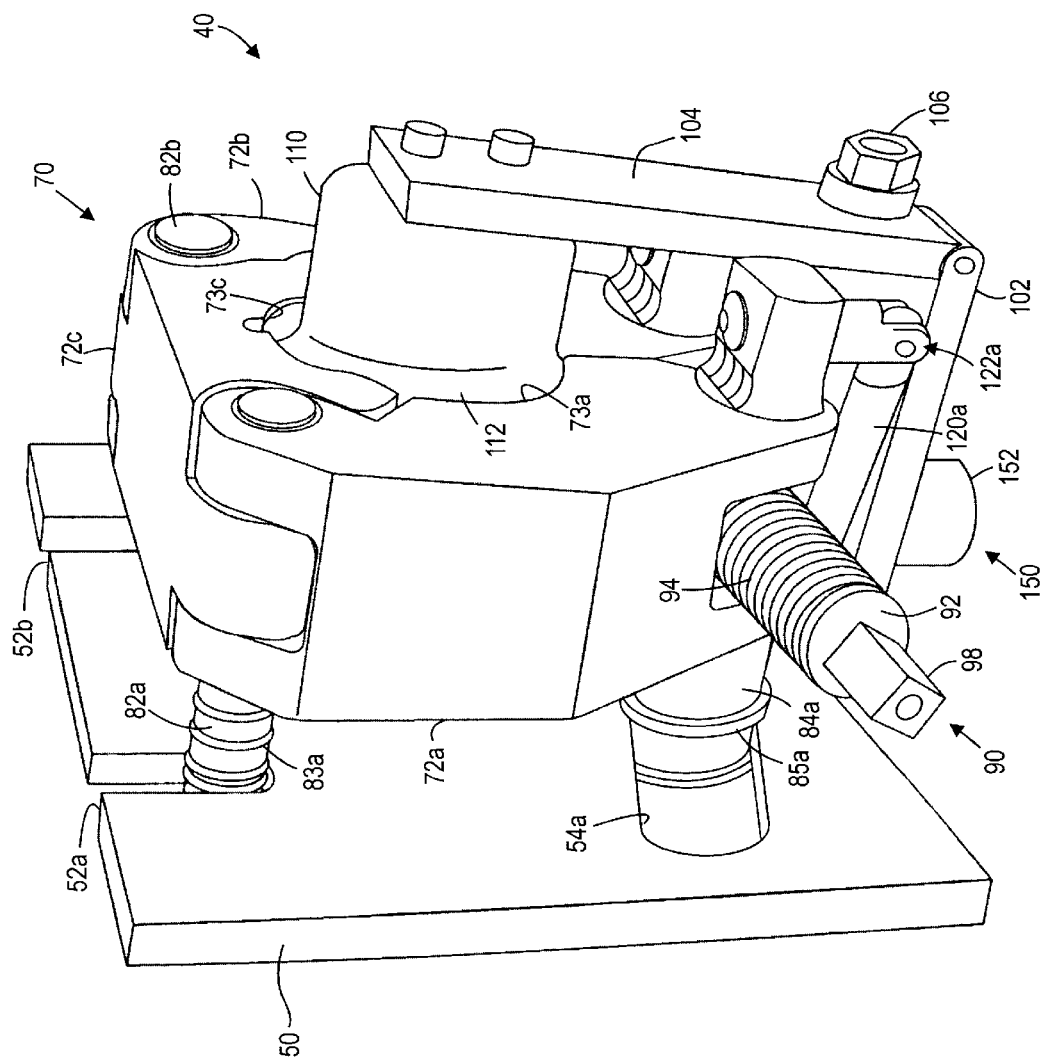
FIGS. 3A–B illustrate perspective views of the remotely operable closure in accordance with the present invention in a closed state.
Figure 3B:
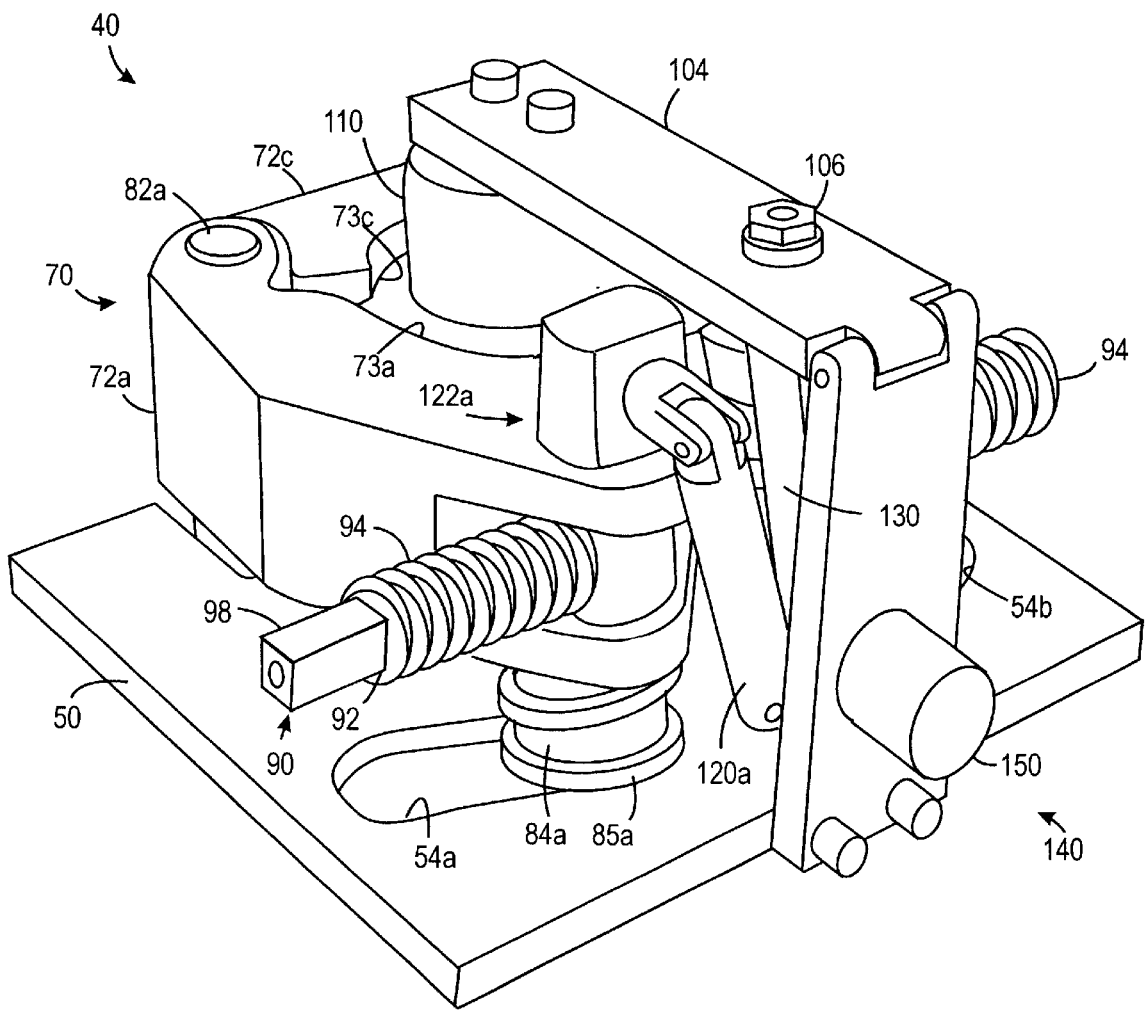

Referring to FIGS. 2A–3B, an embodiment of a remotely operable closure device 40 in accordance with the present invention is illustrated. FIGS. 2A–B illustrate the embodiment of the remotely operable closure device 40 in an open state, and FIGS. 3A–B illustrate the embodiment of the remotely operable closure device 40 in a closed state.

The remotely operable closure device 40 of the present embodiment includes a base or plate 50, a base hub 60, a segmented clamp 70, a drive mechanism 90, a closure/delaying mechanism 100 and a safety mechanism 140. The base hub 60 is attached to an opening (not shown) in the base plate 50. The base hub 60 circumscribes an internal bore 62. The internal bore 62 passes through the base hub 60 and communicates with a pipe or other conduit (not shown) attached to the other end of the base hub 60. The segmented clamp 70 is attached to the base plate 50 by a plurality of shafts 80. The shafts 80 are disposed in slotted apertures 52a–b and 54a–b defined in the base plate 50.

The closure device 40 herein described allows for the segmented clamp 70 to open or close by means of the single drive mechanism 90. The segmented clamp 70 extends around the blind hub 110 and base hub 60. When moved to the closed position, the segmented clamp 70 draws the blind hub 110 into tight engagement with the base hub 60 to form a fluid-tight seal with the base hub 60. Conversely, when the segmented clamp 70 is actuated to the open position, the blind hub 110 is pushed open by the use of the actuating mechanism 100 with built in delay. Clamp segments 72a–c of the segmented clamp 70 are actuated by the drive mechanism 90, preferably a double acting screw 92, which is remotely operable to open or close the segmented clamp 70. A remotely operated vehicle (not shown), such as an unmanned submersible, can open or close the segmented clamp 70 by applying torque to an end 98 of the double acting screw 92.

The segmented clamp 70 may be mounted to the base 50 by shock absorbing pins 80 that travel in slots 52a–b and 54a–b within the base 50. These base plate slots 52a–b and 54a–b serve to properly position the clamping surfaces 73a–c of the clamping segments 72a–c. The blind hub 110 is attached to the base 50 by the connecting arm 104 and by the closure/delaying mechanism 100. The closure/delaying mechanism 100 allows the segmented clamp 70 to open prior to the blind hub 110 moving and, conversely, allows the blind hub 110 to move into position for sealing prior to closing the segmented clamp 70. The invention also includes the safety mechanism 140, preferably a key 150, to prevent unintended opening of the closure device 40.

The remotely operable closure device 40 utilizes field proven metal-to-metal sealing technology. The closure 40 also has a simple, reliable trunnion, and screw mechanism. The floating shafts 84a–b include trunnions (not visible) through which the drive screw 92 of the drive mechanism 90 passes. The drive screw 92 has a first threaded portion 94 with a first pitch that passes through the trunnion in the first floating shaft 84a. The drive screw 92 also includes a second threaded portion 96 with a second pitch that passes through the trunnion in the second floating shaft 84b. The second pitch is opposite to the first pitch.

The single drive screw 92 is adaptable to different drives. The closure 40 allows for manual or remote operation and has a self-supporting base plate. For example, the closure 40 is compatible with hydraulic, pneumatic, or electric power. The closure 40 is designed in accordance with the ASME B31.3, Section VIII Division I and Section VIII Division II design codes. Other applicable codes may also be addressed.

Thus, the present invention provides a remotely operable closure device 40 comprising a plurality of clamp segments 72a–c actuated by the double acting screw 92. The double acting screw 92 may be remotely operated to open and close the clamp-type closure 40. The remotely operable closure device 40 further comprises the blind hub assembly that provides a fluid-tight seal with the closure 40 is in closed position and that allows for the insertion of a pig into the pipeline when in an opened position.

Referring now more particularly to FIGS. 2A–B; the embodiment of the remotely operable closure device 40 is illustrated in a side perspective view. In FIG. 2B, the remotely operable closure device 40 is illustrated in a bottom perspective view.

The remotely operable closure device 40 utilizes the single drive screw mechanism 90 to provide fast opening and closing for manual or remote operation. The remote operation capability makes it ideal for subsea ROV application, hazardous environments, and personnel restricted areas. The single drive screw 92 opens the three clamp segments 72a–c as well as removes and positions the blind hub 110.

In FIGS. 2A–B, the blind hub 110 is shown in an opened position. The blind hub 110 is connected to the connecting arm 104 and closure/delaying mechanism 100. The closure/delaying mechanism 100 serves to ensure that the blind hub 110 is in position prior to the segmented clamp 70 tightening around it, and also allows the clamp 70 to open prior to moving of the blind hub 110 into a position for a pig to be inserted. The segmented clamp 70 is open and closed with the drive mechanism 90. FIGS. 2A–B depict the drive mechanism 90 as the double acting screw 92 having right hand threads at one end 94 and left hand threads 96 at the other. The double acting screw 92 depicted also has a hex or square drive end 98. The clamp assembly is attached to the base 50 with shock absorbing members 83a–b and 85a–b.

As illustrated in FIGS. 2A–3B, the closure/delaying mechanism 100 of the present embodiment includes a support 102, a connecting arm or hub arm 104, the blind hub 110, first and second pivot arms 120a–b and a lever arm 130. The support 102 is a fixed portion of the closure mechanism 100 and is fixedly connected at one end of the support 102. The blind hub 110 is connected to the end of the hub arm 104. The blind hub 110 includes a flange to engage the clamping surfaces 73a–c of the segments 72a–c.

The first pivot arm 120a is connected at one end by a joint 122a on the floating shaft 84a. The second pivot arm 120b is also connected at one end by a joint 122b on the floating shaft 84b. At another end, the first and second pivot arms 120a–b both connect to the lever arm 130 by a joint (not shown) defining a movable central point of the mechanism 100. The lever arm 130, in turn, connects to a joint 132, which attaches to the hub arm 104 by a fastener 106.

Referring in particular to FIG. 2B, the safety mechanism 140 of the present invention is illustrated. the safety mechanism 140 includes a key 150 and a slot 152. The slot 152 is defined in the support 102. In FIG. 2B, the key 150 is shown removed from the key slot 152.

To close the remotely operable closure device 40, the drive screw 92 is engaged and rotated to bring the clamp segments 72a–c and the blind hub 110 back to the assembled condition. Next, the safety key 150 is inserted. If not inserted properly, a leak will occur on startup, alerting the user that the safety device 140 is not in place.

Referring to FIGS. 3A–B, perspective views of the present invention illustrate the remotely operable closure device 40 is illustrated in a bottom perspective view. The blind hub 110 is in the closed position. The segmented clamp 70 locks the blind hub 110 into a fluid-tight seal with the base hub 60.

To open the remotely operable closure device 40, the safety key 150 is first rotated and pulled from the assembly. This feature prevents the opening of the closure 40 under pressure by releasing a safety valve (not shown) in the assembly. Next, the drive screw 92 is engaged and rotated. The combined segmented clamp 70 and closure mechanism 100 are actuated during the rotation of the screw 92, sliding the clamp segments 72a–c and swinging the blind hub 110 out for access to the closure.

In an example implementation of the remotely openable closure device 40, a remotely operated subsea vehicle ROV (not shown) may travel to the location of a submerged pipeline (not shown) and interface with the remotely operated closure device 40 of the present invention. The closure device 40 may provide aligning guides or interfaces (not shown) for the ROV to use as landmarks. Once in position, the ROV may access the safety key 150 shown in FIGS. 3A–B. Access to the safety key 150 may or may not convey information to the ROV about whether the pipeline is pressurized or not. Either by access to the safety key 150 or by access to a test port (not shown) in the pipeline adjacent the closure device 40 the ROV may determine or verify that the pipeline is not pressurized.

Once it has been determined that the pipeline i not pressurized or is pressurized at a sufficiently low level, the ROV may activate the safety key 150, which in one embodiment requires physically removing the key from the connecting arm 102. It will be appreciated that while the safety key 150 is located on the closure device 40, the drive mechanism 90 will not be able to unclamp the segmented clamp 70 from the blind hub 110 and the base hub 60 or more to move the blind hub 110 away from the base hub 60.

Once the ROV has activated the safety mechanism 140, the drive mechanism 90 is then actuated. By rotating the drive mechanism 90, the segmented clamp 70 shown in FIGS. 2A–3B is articulated away from sealing engagement with the blind hub 110 and base hub 60. As shown in FIGS. 2A–B, the linkage or closure/delaying mechanism 100 between the segmented clamp 70 and the blind hub 110 is such that a delay is built in, whereby the segmented clamp 70 is opened a sufficient amount prior to the blind hub 110 being forced away from the base hub 60 by the arm 104. This delay in the mechanism 100 is necessary so that the blind hub 110 does not begin to move until the segmented clamp 70 has sufficiently cleared the interface between the blind hub 110 and the base hub 60.

As shown in FIGS. 2A–3B, the closure/delaying mechanism 100 is attached to the outer moving ends of the floating shafts 120a–b of the segmented clamp 70. As the segmented clamp 70 and ends move away from each other, the central point or joint (not shown) of the closure/delaying mechanism 100 moves in a direction toward the blind hub 110. The lever arm 130 is attached to the center point of the closure/delaying mechanism 100. As the center point moves toward the blind hub 110, so does the lever arm 130. As the lever arm 130 moves toward the blind hub 110, the arm 130 acts against the connecting arm 104, which, as shown in FIGS. 2A–B, causes the blind hub 110 to pivot away from the base hub 60.

Upon further activation of the drive mechanism 90 by the ROV, the blind hub/connecting arm assembly is moved sufficiently from the opening 64 of the base hub 60 such that a pigging tool or other device (not shown) may be inserted into the pipeline. Once the tool has been inserted, the ROV may reverse the actuation of the drive mechanism 90, causing the movable ends of the segmented clamp 70 with the joints 120a–b to move toward one another and causing the central point (not shown) of the closure/delaying mechanism 100 to travel in a direction away from the blind hub.

This direction of travel is transferred to the lever arm 130 and then to the connecting arm 104, causing the blind hub 110 to be drawn back into contact with the base hub 60. In this closing procedure, the closure/delaying mechanism 100 allows the blind hub 110 to move inside the segmented clamp 70 when it is sufficiently open to allow the blind hub 110 inside. Once the blind hub 110 is inside the segmented clamp 70, further activation of the drive mechanism 90 closes the clamping surfaces 73a–c about the blind hub 110 and the base hub 60, thereby forming the sealed connection.

In addition, the blind hub and hub assembly may utilize a sealing mechanism (not shown), such as an energized metal seal or an elastomeric seal. A retainer mechanism (not shown) on either blind hub 110 or base hub 60 may hold the sealing mechanism in place during opening and closing of the device 40. In a preferred embodiment, the sealing mechanism is an energized metallic seal that is held in place by an elastomeric member. When the closure device 40 is in an open position, the ROV may replace the sealing mechanism with a new or refurbished mechanism.

The materials from which the remotely operable closure device 40 of the present invention may be made are well known to those skilled in the art. Depending upon the expected life or environment of the device 40, carbon steel, composite materials, stainless steel or other non-corrosive or less corrosive materials may be used.

The present embodiment of the remotely operable closure device 40 demonstrates the use of the invention with a three-segment clamp 70. It will be appreciated that the present invention may be implemented with segmented clamps having more or less components. Furthermore, the drive mechanism 90 and the closure/delaying mechanism 100 in the present embodiment are mechanical in nature. It is contemplated, however, that one or more of the drive mechanism 90 or closure/delaying mechanism 100 may be hydraulic, pneumatic, or electrical in nature. For example, the ROV may actuate hydraulic RAMS for the drive mechanism that open and close the segmented clamp 70. Similarly, the blind hub 110 can be moved using a hydraulic actuator.

The preferred embodiment of the invention disclosed in the attached figures and description illustrates a single actuation force that accomplishes both the opening of the invention and the removal of the blind hub 110 from the base hub 60. This is the presently preferred embodiment of the invention, but it is not the only embodiment of the invention as this disclosure makes clear. It is also contemplated that the invention may use the benefits of gravity to affect either opening or closing the blind hub 100 with the base hub 60.

The present invention may also have non-oceanic applications. For instance, the present invention may find application in any location where safety or environmental considerations prohibit personnel from working with standard pipeline closures. It is also contemplated that a portion of the segmented clamp 70, such as the fixed portion 72c shown in FIGS. 2A–3B can provide a shield or cover (not shown) for the base hub 60. In this manner, the sealing mechanism (not shown) can be located on the base hub 60, which can be shielded from detrimental affects of the environment by the fixed portion 72c of the segmented clamp 70.

The foregoing description of preferred and other embodiments of the present invention is not intended to limit or restrict the breadth, scope, or applicability of the invention that was conceived of by the Applicant. In exchange for disclosing the inventive concepts contained herein, the Applicant desires all patent rights afforded by the appended claims.

What is claimed is:

1. A closure device for a conduit, comprising:
   a first mechanism moving a first hub into relation with a second hub attached to the conduit to close access to the conduit or moving the first hub out of relation with the second hub to open access to the conduit;
   a second mechanism retaining the first hub in sealed engagement with the second hub or releasing the first hub from sealed engagement with the second hub; and
   a third mechanism simultaneously actuating the first mechanism and the second mechanism.

2. The closure device of claim 1, further comprising a fourth mechanism preventing actuation of the first mechanism or the second mechanism.

3. The closure device of claim 1, wherein the first mechanism comprises a delaying mechanism allowing the second mechanism to release the first hub out of sealed engagement with the second hub prior to allowing the first mechanism to move the first hub out of relation with the second hub.

4. The closure device of claim 1, wherein the second mechanism comprises a clamp having one or more movable clamp segments.

5. The closure device of claim 4, wherein the third mechanism comprises a drive screw opening and closing the clamp.

6. The remotely operable closure of claim 5, wherein the first mechanism comprises a linkage connecting the first hub with the clamp.

7. The closure device of claim 6, wherein the linkage pivots the first hub towards the second hub with the closing of the clamp or pivots the first hub away from the second hub with the opening of the clamp.

8. A remotely operable closure for a conduit, comprising:
   a base hub allowing access to the conduit;
   a closure mechanism having a blind hub and actuatable to move the blind hub into or out of engagement with the base hub;
   a clamping mechanism disposed about the base hub and actuatable to clamp or unclamp about the base hub and the blind hub; and
   a drive mechanism remotely operable to actuate both the clamping mechanism and the closure mechanism.

9. The remotely operable closure of claim 8, further comprising a safety mechanism preventing actuation of the clamping mechanism or the closure mechanism.

10. The remotely operable closure of claim 9, wherein the safety mechanism comprises a key retaining the closure mechanism in a locked position.

11. The remotely operable closure of claim 8, wherein the closure mechanism comprises a delaying mechanism allowing the clamping mechanism to unclamp about the base hub and the blind hub prior to moving the blind hub out of engagement with the base hub.

12. The remotely closure of claim 8, wherein the clamping mechanism comprises a segmented clamp having first, second and third movable clamp segments.

13. The remotely operable closure of claim 12, wherein the drive mechanism comprises a drive screw having first and second portions with opposite pitch, the first portion passing through a trunnion in the first movable clamp segment and the second portion passing through a trunnion in the second movable clamp segment.

14. The remotely operable closure of claim 13, wherein the closure mechanism transfers movement of the first and second movable clamp segments to pivot the blind hub in relation to the base hub.

15. The remotely operable closure of claim 13, wherein the closure mechanism comprises:
   a main arm having the blind hub and pivotally connected to a fixed portion of the remotely operable closure;
   a first arm pivotally connected to the first movable clamp segment;
   a second arm pivotally connected to the second movable clamp segment; and
   an interconnecting arm pivotally connected to the first and second arms at one end and pivotally connected to the main arm at another end.

16. A method for remotely operating a closure, the closure having a first hub, a second hub, and an opening in the second hub, attached to a conduit comprising the steps of:
   a) actuating a single mechanism with a first operation, which includes both:
      (i) moving the first hub into relation with the second hub to close access to the opening of the closure and the conduit with the first operation of the single mechanism, and
      (ii) clamping the first hub in sealed engagement with the second hub with the first operation of the single mechanism; and
   b) actuating the single mechanism with a second operation, which includes both:
      (i) unclamping the first hub from sealed engagement with the second hub with the second operation of the single mechanism, and
      (ii) moving the first hub out of relation with the second hub to open access to the opening of the closure and the conduit with the second operation of the single mechanism.

17. The method of claim 16, further comprising the step of delaying movement of the first hub out of relation with the second hub before unclamping the first hub from sealed engagement with the second hub.

18. The method of claim 16, further comprising the step of preventing movement of the first hub out of relation with the second hub by locking a safety mechanism.

19. The method of claim 16, wherein clamping or unclamping the first hub in or out of sealed engagement with the second hub comprises the step of opening or closing a clamp about the first hub and the second hub.

20. The method of claim 19, wherein moving the first hub into or out of relation with the second hub by actuating the single mechanism comprises the step of movably interlinking movement of the first hub with the opening and closing of the clamp.

* * * * *